US010384736B2

United States Patent
Pizarro

(10) Patent No.: US 10,384,736 B2
(45) Date of Patent: Aug. 20, 2019

(54) DUAL OSCILLATING CYCLE SADDLE AND SUPPORT SYSTEM

(71) Applicant: Marcelo A. Pizarro, Lake Arrowhead, CA (US)

(72) Inventor: Marcelo A. Pizarro, Lake Arrowhead, CA (US)

( * ) Notice: Subject to any disclaimer, the term of this patent is extended or adjusted under 35 U.S.C. 154(b) by 0 days.

(21) Appl. No.: 15/238,531

(22) Filed: Aug. 16, 2016

(65) Prior Publication Data

US 2018/0015975 A1 Jan. 18, 2018

Related U.S. Application Data

(60) Provisional application No. 62/361,992, filed on Jul. 13, 2016.

(51) Int. Cl.
*B62J 1/04* (2006.01)
*B62J 1/00* (2006.01)

(52) U.S. Cl.
CPC .............. *B62J 1/005* (2013.01); *B62J 1/007* (2013.01); *B62J 1/04* (2013.01)

(58) Field of Classification Search
CPC .................................... B62J 1/005; B62J 1/04
See application file for complete search history.

(56) References Cited

U.S. PATENT DOCUMENTS

| 604,347 A * | 5/1898 | Bray | B62J 1/005 |
| | | | 297/201 |
| 4,089,559 A * | 5/1978 | Prange | B62J 1/002 |
| | | | 297/201 |
| 4,387,925 A * | 6/1983 | Barker | B62J 1/002 |
| | | | 297/195.13 |
| 4,541,668 A * | 9/1985 | Rouw | B62J 1/002 |
| | | | 297/201 |
| 5,725,274 A * | 3/1998 | Bergmeister | B62J 1/002 |
| | | | 297/201 |
| 5,988,740 A * | 11/1999 | Caraballo | B62J 1/005 |
| | | | 297/195.1 |
| 6,045,180 A | 4/2000 | Clutton | |
| 6,056,356 A * | 5/2000 | Unger, Jr. | B62J 1/002 |
| | | | 297/195.1 |
| 6,357,825 B1 * | 3/2002 | Bavaresco | B62J 1/002 |
| | | | 297/201 |
| 6,786,542 B1 * | 9/2004 | Nuzzarello | B62J 1/005 |
| | | | 297/195.1 |

(Continued)

*Primary Examiner* — Timothy J Brindley
(74) *Attorney, Agent, or Firm* — Roland Tong

(57) ABSTRACT

A cycle comprising a cycle frame, a first saddle component, a first support component coupled to the first saddle component and to the cycle frame, wherein the first saddle component moves between an upper pedaling position and a lower pedaling position, a second saddle component, and a second support component coupled to the second saddle component and to the cycle frame, wherein the second saddle component moves between the upper pedaling position and the lower pedaling position, and the first saddle component and the second saddle component are configured to distribute a weight of a rider over a buttocks region and an upper leg region of the rider is shown. In one embodiment, the first saddle component and the second saddle component are ergonomically shaped to contour the rider's buttocks region and upper leg region.

20 Claims, 13 Drawing Sheets

(56) References Cited

U.S. PATENT DOCUMENTS

| | | | | |
|---|---|---|---|---|
| 2003/0067195 A1* | 4/2003 | Sylvester | ............... | B62J 1/005 297/201 |
| 2007/0182224 A1* | 8/2007 | Jansch | ................. | B62J 1/005 297/214 |
| 2007/0257527 A1* | 11/2007 | Marc | .................... | B62J 1/005 297/215.1 |
| 2008/0054689 A1* | 3/2008 | Tucker | .................. | B62J 1/005 297/201 |
| 2014/0375092 A1* | 12/2014 | Curless | ................. | B62J 1/005 297/201 |
| 2015/0076797 A1* | 3/2015 | Alink | ..................... | A61H 3/04 280/647 |
| 2017/0313372 A1* | 11/2017 | Eldredge | ................. | B62J 1/08 |

\* cited by examiner

DUAL OSCILLATING CYCLE SADDLE AND SUPPORT SYSTEM

CROSS-REFERENCE TO RELATED APPLICATIONS

This application claims the benefit of priority on U.S. Provisional Application No. 62/361,992, filed Jul. 13, 2016, the entire contents of which are incorporated by reference herein.

FIELD

Embodiments of the disclosure relate to the field of cycle seats. More specifically, embodiments of the disclosure relate to a cycle saddle and support system, which includes a saddle that transfers the weight, pressure and motion dynamics from the pelvis region down through the legs of the rider.

GENERAL BACKGROUND

Cycling typically includes the use of a seat comprising a support member for a rider that supports a pelvic region of a rider. The seat traditionally comprises a single member, occasionally covered, at least in part, by foam and an outer protective material (e.g., leather). Broadly, the cycle seat has the functionality of providing a rider support. However, the traditional seat (also referred to herein as a saddle) may places a large amount of weight and pressure on a small surface, typically the pelvic region. The pressure and weight placed on a rider's pelvic region has often resulted in numerous ailments to the rider's pelvic region.

These ailments may range from minor to severe and may include the pain and dysfunction to the sexual organs and the general pelvic area. Previous advancements may to seat designs have failed to address and resolve the numerous physical and sexual injuries that are far too common to the avid bike enthusiast. For example, the pressure on the nerves and blood vessels in the genital area of a rider may result in reduced sexual sensation; thus, harming a rider's sexual health. Additionally, using a traditional seat while cycling may result in negative effects on the prostate region of a rider.

One alternative to a traditional seat is a recumbent seat, which places the rider in a laid-back, reclining position. A second alternative includes a noseless cycle seat, which has been shown to reduce numbness and genital discomfort in male cyclists. However, both alternatives fail to remove the pressure and weight from the relatively small surface area of the pelvic region of the rider.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to a dual oscillating cycle saddle and support system that transfers weight, pressure and motion dynamics from a rider's pelvic region down through the legs. The transfer of weight, pressure and motion dynamics alleviates pressure placed traditionally placed on the rider's pelvic region, especially the coccyx. In one embodiment, the dual oscillating cycle saddle does not include a central nose. In yet another embodiment, the dual oscillating cycle saddle are configured as leg supports that travel on in an arc-like motion relative to the fixed frame of the cycle.

As will be discussed herein, the vestigial tail (hence the common term "tailbone") consists of three or more very small bones fused together. It is known that the entire coccyx is not one solid bone, and often there is some limited movement between the bones permitted by the fibrous joints. Additionally, a human hip includes a ball and socket joint. The ball is the upper part of the femur. The socket is included within the pelvis.

One benefit of riding a bicycle incorporating the dual oscillating cycle saddle and support system as disclosed herein is that the natural pendulum action of the legs swings at the Femur Ball Axis (FBA) and transfer the body weight down through the gluteus and upper leg thus completely eliminating involvement and aggravation of the coccyx.

Additionally, in the following description, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for improving the pressure and weight placed on a cycle rider's pelvic region as compared to traditional cycle seats. As this invention is susceptible to embodiments of many different forms, it is intended that the present disclosure is to be considered as an example of the principles of the invention and not intended to limit the invention to the specific embodiments shown and described.

I. General Structure of the Dual Oscillating Cycle Saddle

Figure 1A:
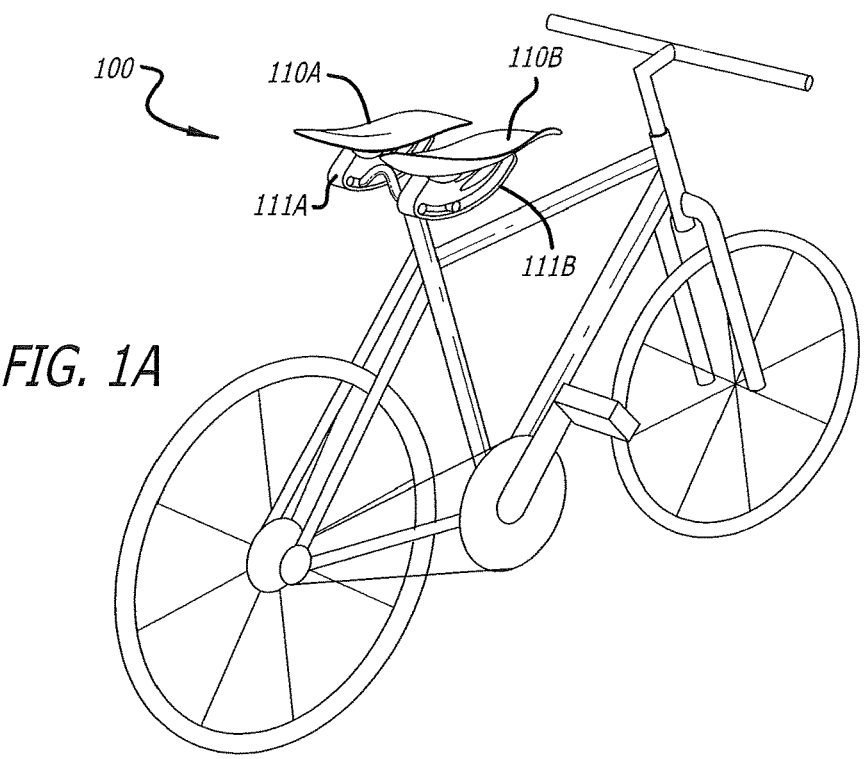
FIG. 1A is an exemplary illustration of a bicycle incorporating an embodiment of the dual oscillating cycle saddle and support system.
Figure 1B:
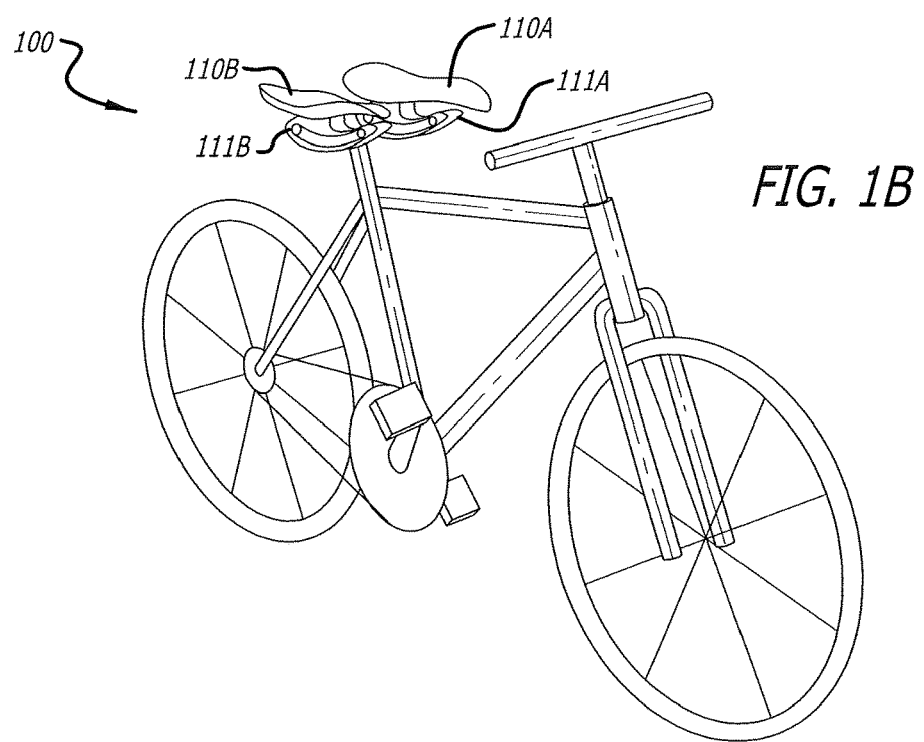
FIG. 1B is a front-side view of the exemplary illustration of the bicycle incorporating the embodiment of the dual oscillating cycle saddle and support system of FIG. 1A.
Figure 1C:
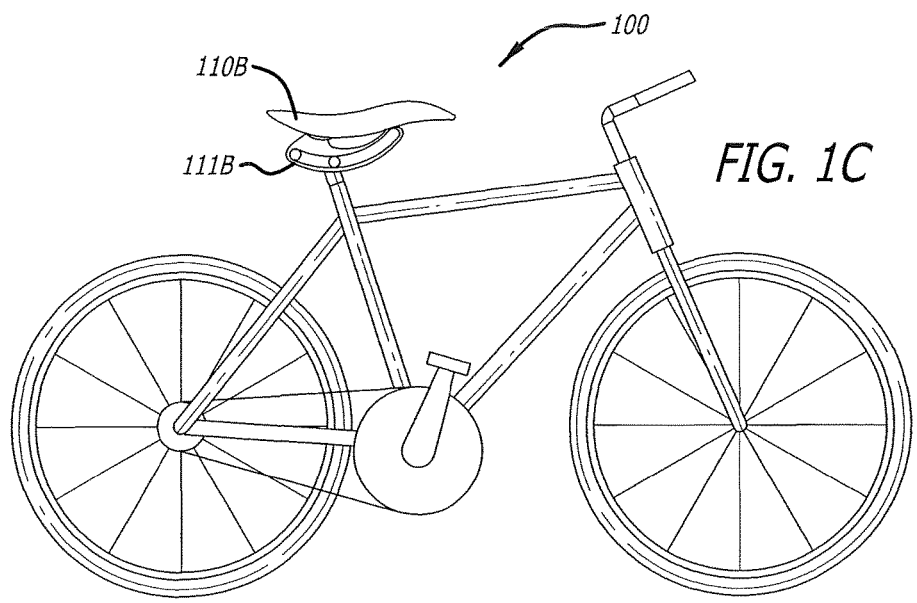
FIG. 1C is a side view of the exemplary illustration of the bicycle incorporating the embodiment of the dual oscillating cycle saddle and support system of FIG. 1A.
Figure 1D:
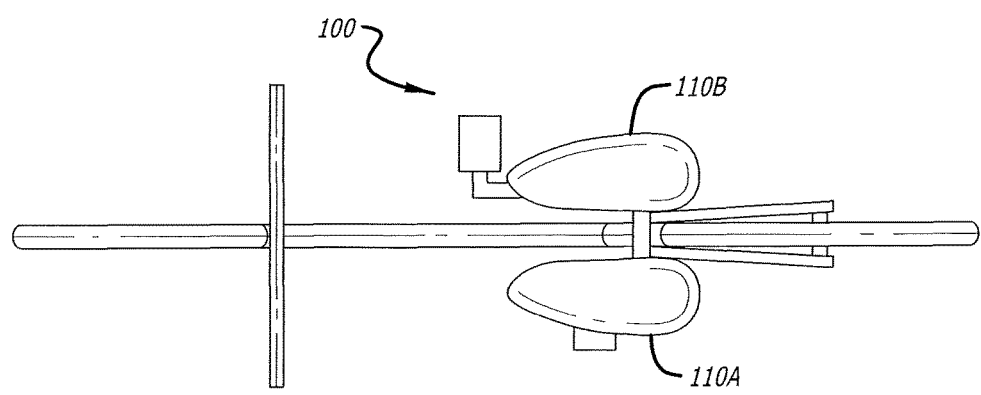
FIG. 1D is a top view of the exemplary illustration of the bicycle incorporating the embodiment of the dual oscillating cycle saddle and support system of FIG. 1A.

Referring to FIG. 1A, an exemplary illustration of a bicycle incorporating an embodiment of the dual oscillating cycle saddle and support system is shown. The embodiment portrayed in FIG. 1A provides one preferred embodiment of a bicycle 100 having a dual oscillating cycle saddle and support system incorporated thereon. The dual oscillating cycle saddle (also referred to herein as an "ergonomic gluteus support") and support system is comprised of two dual oscillating saddle components 110A-110B and a support system components 111A-111B. The support system components 111A-111B will be discussed below in further detail. Referring to FIG. 1B, a front-side view of the exemplary illustration of the bicycle incorporating the embodiment of the dual oscillating cycle saddle and support system of FIG. 1A is shown. FIG. 1C provides a side view of the exemplary illustration of the bicycle incorporating the embodiment of the dual oscillating cycle saddle and support system of FIG. 1A. Furthermore, FIG. 1D provides a top view of the exemplary illustration of the bicycle incorporating the embodiment of the dual oscillating cycle saddle and support system of FIG. 1A.

Figure 2A:
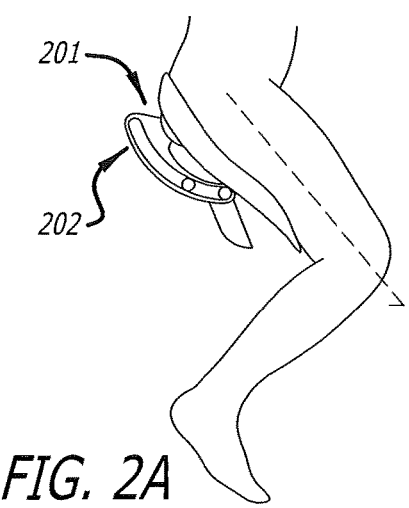
FIG. 2A is an exemplary illustration of a lower torso of a rider utilizing the dual oscillating cycle saddle and support system of FIG. 1A in a lower pedaling leg position.
Figure 2B:
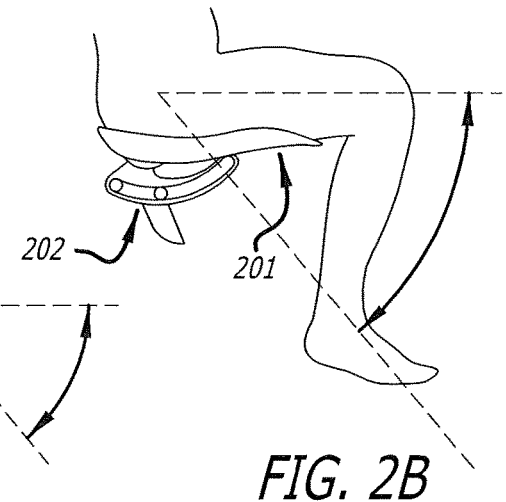
FIG. 2B is an exemplary illustration of a lower torso of a rider utilizing the dual oscillating cycle saddle and support system of FIG. 1A in an upper pedaling leg position.
Figure 2C:
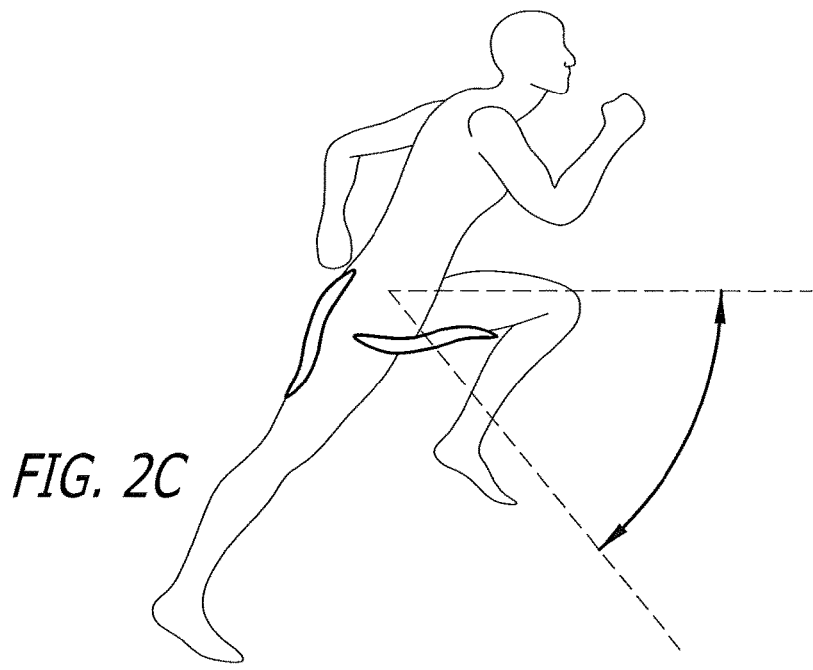
FIG. 2C is an exemplary diagram illustrating how the dual oscillating cycle saddle of FIG. 1A enables a rider to mimic the natural body mechanics of a runner.

Referring to FIG. 2A, an exemplary illustration of a lower torso of a rider utilizing the dual oscillating cycle saddle and support system of FIG. 1A in a lower pedaling leg position is shown. The illustration of FIG. 2A provides a clear indication of the support the dual oscillating cycle saddle component 201 provides to a rider. In the embodiment shown, the dual oscillating cycle saddle component 201 may be configured to form-fit the underside of a rider's leg, thereby removing the totality of the pressure on the bones, blood vessels, nerves and muscles comprising the pelvic area and instead distributing the pressure across a wider surface area including at least a upper region of each leg. Referring to FIG. 2B, an exemplary illustration of a lower torso of a rider utilizing the dual oscillating cycle saddle and support system of FIG. 1A in an upper pedaling leg position is shown. Contrasting FIG. 2B with FIG. 2A, it is clear how the pedaling longitudinal pendulum 202 of the support system moves in an arc relative to a base bar, as will be discussed below. Herein, it is seen that the pedaling longitudinal pendulum 202 remains in a fixed position relative to the dual oscillating cycle saddle component 201 while moving in an arc relative to the base bar of the support system. Referring to FIG. 2C, an exemplary diagram illustrating how the dual oscillating cycle saddle of FIG. 1A enables a rider to mimic the natural body mechanics of a runner is shown. Based on FIG. 2C, it is clear how the motion of the dual oscillating cycle saddle component 201 and the form-factor of the dual oscillating cycle saddle enables a rider to mimic the natural movement of a runner while riding a cycle incorporating the dual oscillating cycle saddle and support system.

A. Dual Oscillating Saddle Component Structure

Figure 3A:
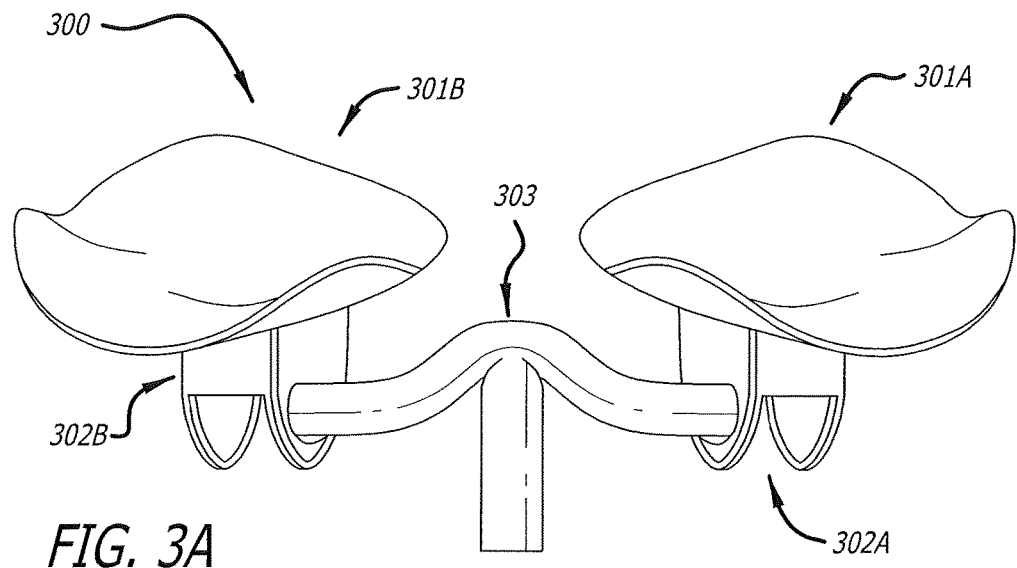
FIG. 3A is a front view of an exemplary illustration of the dual oscillating cycle saddle and support system of FIG. 1A.

Referring to FIG. 3A, a front view of an exemplary illustration of the dual oscillating cycle saddle and support system of FIG. 1A is shown. The dual oscillating cycle saddle and support system 300 comprises dual oscillating saddle components 301A-301B, pedaling longitudinal pendulums 302A-302B and a T-arm 303 (also referred to herein as a center base (cycle attachment)). In the preferred embodiment of FIG. 3A, the dual oscillating cycle saddle and support system 300 includes two dual oscillating saddle components 301A and 301B. Each of the dual oscillating saddle components 301A and 301B support a single lower torso of a rider. Thus, instead of the weight of a rider being placed almost entirely on the rider's tailbones, the weight is distributed over a much larger surface area including the buttocks and legs. The dual oscillating saddle components 301A and 301B may be molded in an ergonomic shape contoured to the buttocks and upper leg region. The buttocks region may include at least the following muscles: a gluteus medius, a gluteus maximus, a gluteus minimus and a piriformis. Additionally, the buttocks region may include at least the following bones: the pelvis (the ilium, the sacrum, the sacral promontory, symphysis pubis, the ischium, the pubic crest, the pubic bone), the vestigial tail (commonly referred to as "the tailbone" or the coccyx). The upper leg region may include at least the following muscles: a gluteus medius, a gluteus maximus, a gluteus minimus and a piriformis, an adductor magnus, a semitendinosus, and a biceps formis. The upper leg region may include at least the following bones: the pelvis, the tailbone, the coccyx, a left and right femur. As can be seen from the illustration of FIG. 3A, the preferred embodiment does not include a central nose or a component that directly couples the two dual oscillating saddle components 301A and 301B together. Instead, the dual oscillating saddle components 301A and 301B are indirectly coupled through the support system and the T-arm 303.

Figure 3B:
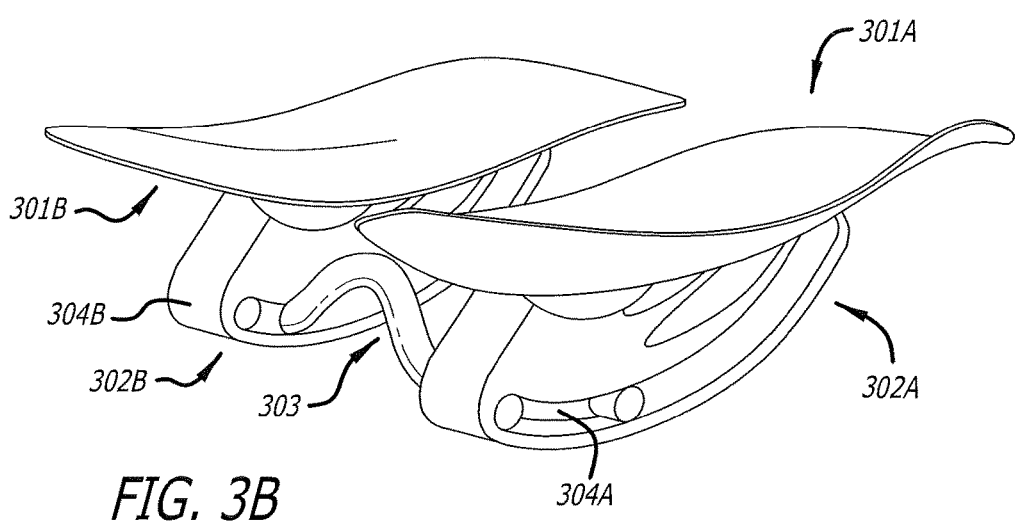
FIG. 3B is a back-side view of the exemplary illustration of the dual oscillating cycle saddle and support system of FIG. 3A.
Figure 3C:
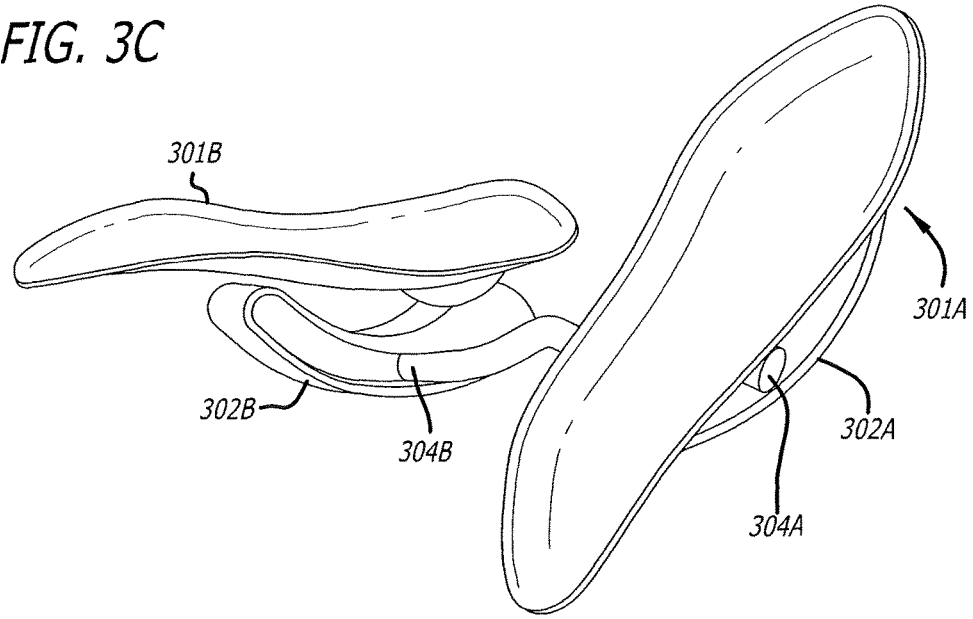
FIG. 3C is a front-side view of an exemplary illustration of the dual oscillating cycle saddle and support system of FIG. 3A.
Figure 3D:
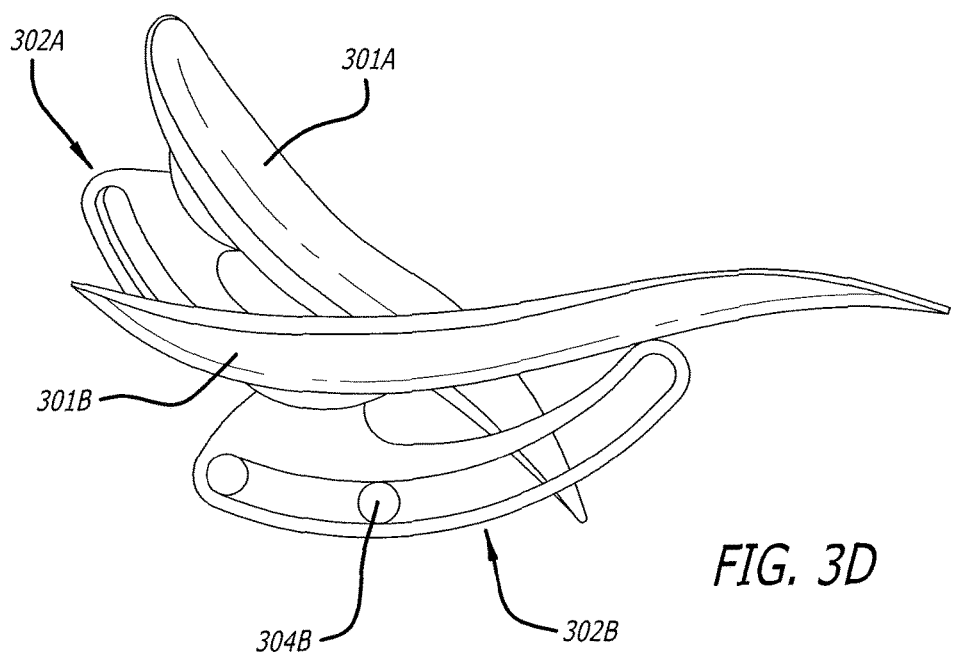
FIG. 3D is a side view of an exemplary illustration of the dual oscillating cycle saddle and support system of FIG. 3A.

Referring to FIG. 3B, a back-side view of the exemplary illustration of the dual oscillating cycle saddle and support system of FIG. 3A is shown. The illustration of FIG. 3B provides a back-side view of the dual oscillating cycle saddle and support system, wherein the two pedaling longitudinal pendulums 302A-302B are seen to couple with the T-arm 303 via the static glide carts 304A-304B. The static glide carts 304A-304B, which will be discussed in detail below, include rolling elements that couple with tracks of the two pedaling longitudinal pendulums 302A-302B enabling that two pedaling longitudinal pendulums 302A-302B to swing in an arc relative to the T-arm 303 as the rider pedals. In one embodiment, a rolling element may include a ball bearing. Referring to FIG. 3C, a front-side view of an exemplary illustration of the dual oscillating cycle saddle and support system of FIG. 3A is shown. The illustration of FIG. 3C shows a front-side view of the dual oscillating cycle saddle and support system wherein the dual oscillating cycle saddle 301A (i.e., the left saddle) is in a lower pedaling position while the dual oscillating cycle saddle 301B (i.e., the right saddle) is in an upper pedaling position. When the dual oscillating cycle saddle 301A is in the lower pedaling position, the glide cart 304A is seen to be at the front portion of the track of the pedaling longitudinal pendulum 302A. In contrast, when the dual oscillating cycle saddle 301B is in the upper pedaling position, the glide cart 304B is seen to be at the rear portion of the track of the pedaling longitudinal pendulum 302B. FIG. 3D provides a side view of an exemplary illustration of the dual oscillating cycle saddle and support system of FIG. 3A.

B. Saddle Support System

Figure 4:
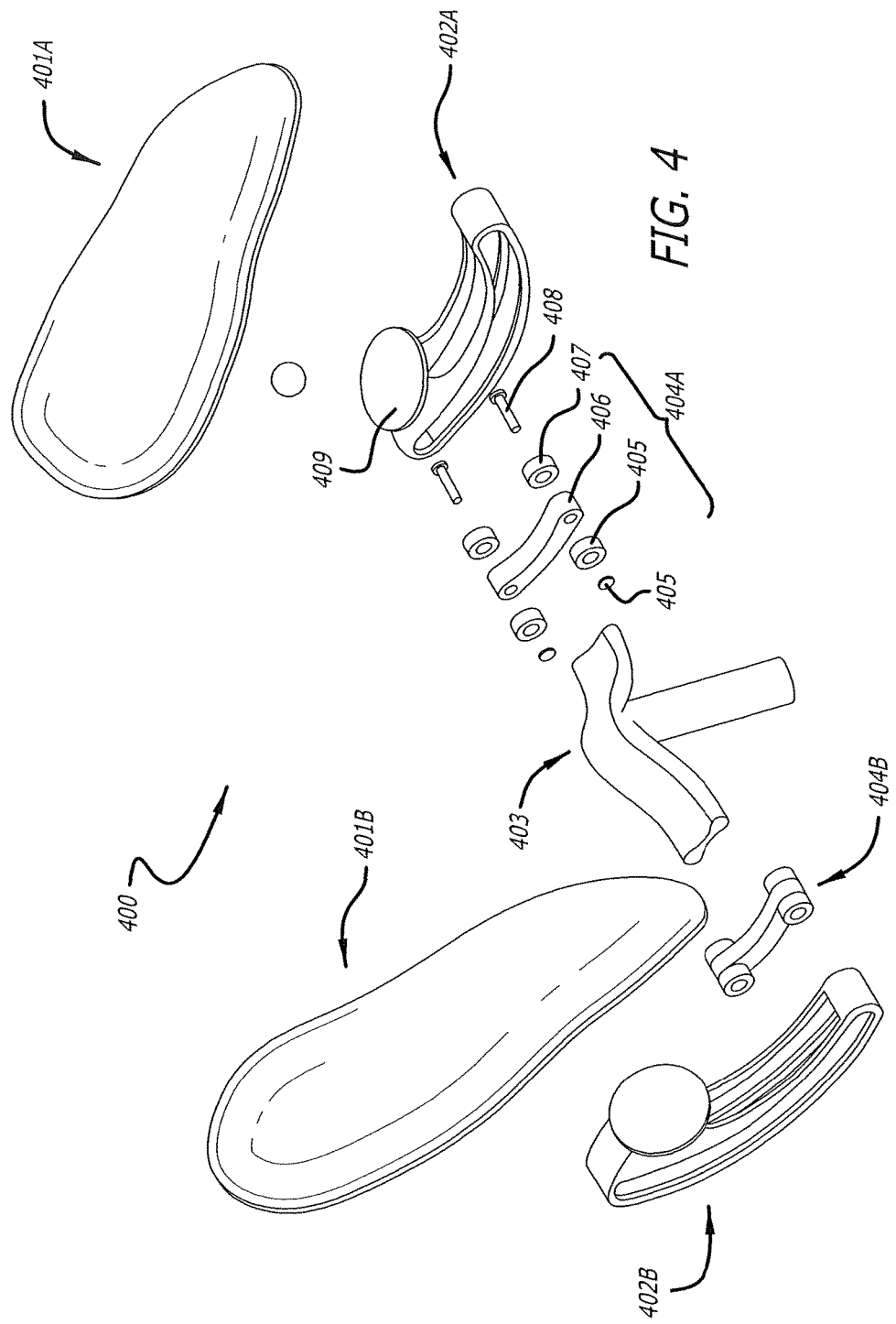
FIG. 4 is an exploded view of the dual oscillating cycle saddle and support system of FIG. 1A.

Referring now to FIG. 4, an exploded view of the dual oscillating cycle saddle and support system of FIG. 1A is shown. The illustration of FIG. 4 provides a clear indication as to how the preferred embodiment of the components of the dual oscillating cycle saddle and support system may be coupled together. As is shown, the dual oscillating cycle saddles 401A-401B coupled to the pedaling longitudinal pendulums 402A-402B via pivoting bases 409A-409B. The pedaling longitudinal pendulums 402A-402B couple to the T-arm 403 via the glide carts 404A-404B. In detail, the glide cart 404B is comprised of holding nuts 405, a cart beam 406, rolling elements 407 and cross tight bolts 408. As was mentioned above, the glide cart 404B is configured to slide along a track within the pedaling longitudinal pendulums 402B. As the glide cart 404B is fixed to the T-arm 303 and remains static relative to the bicycle frame, the pedaling longitudinal pendulums 402B rotates in an arc motion, thereby moving the oscillating cycle saddle 401B as the cycle rider pedals.

Figure 5A:
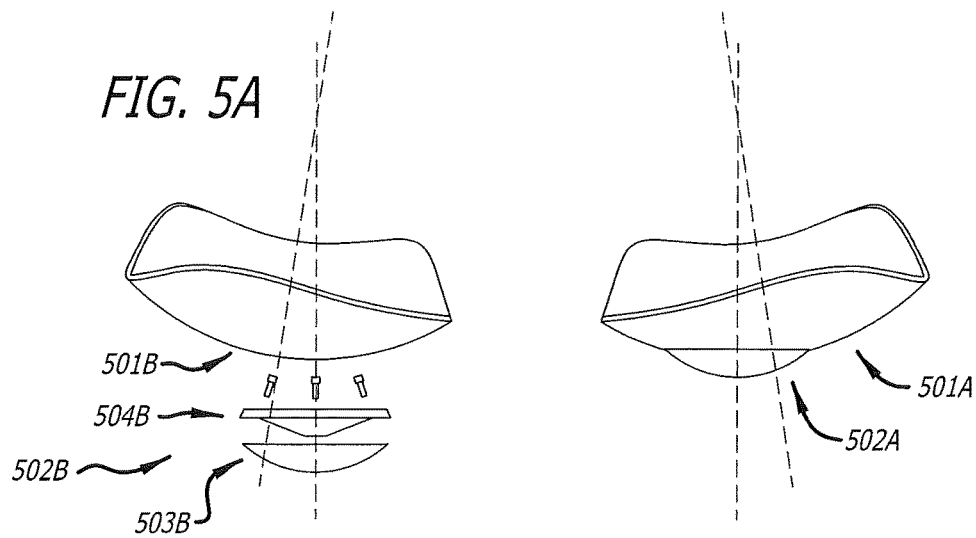
FIG. 5A is front view of an exemplary illustration of a saddle and swivel base coupler of the dual oscillating cycle saddle and support system of FIG. 1A.
Figure 5B:
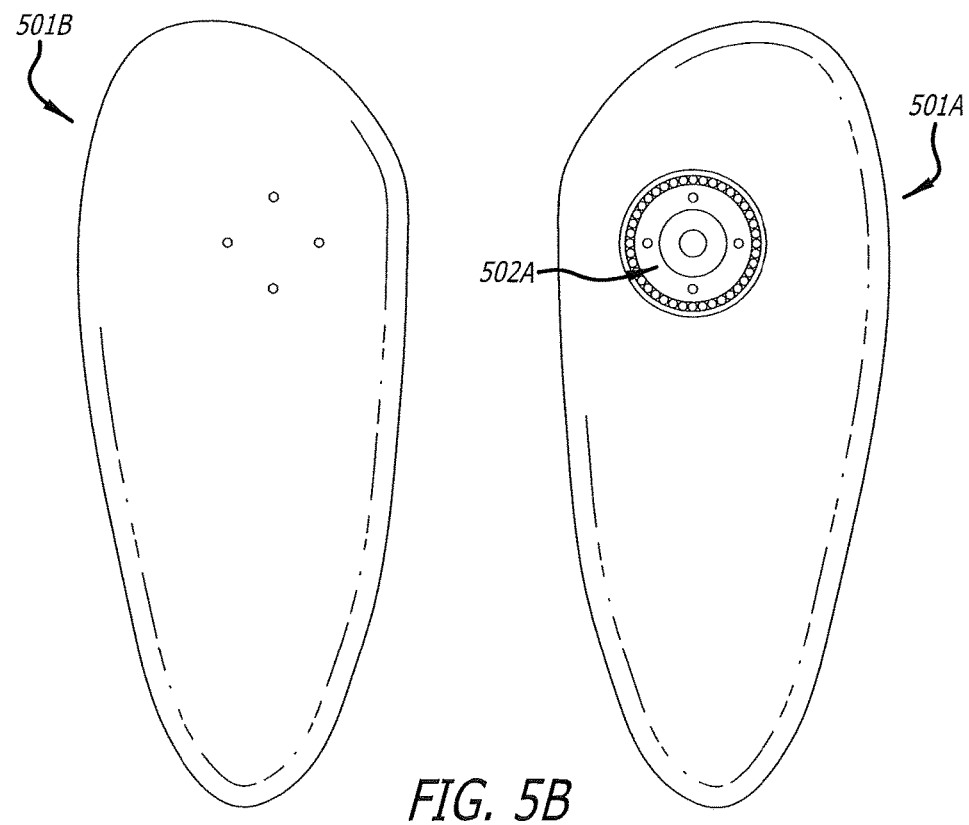
FIG. 5B is top view of the exemplary illustration of a saddle and swivel base coupler of the dual oscillating cycle saddle and support system of FIG. 5A.

Referring to FIG. 5A, a front view of an exemplary illustration of a saddle and swivel base coupler of the dual oscillating cycle saddle and support system of FIG. 1A is shown. The illustration of FIG. 5A includes an overlay of a pelvis atop of the dual oscillating cycle saddles 501A-501B. Specifically, this embodiment of FIG. 5A illustrates how the weight of the rider is transferred off of the pubic and onto the legs. Additionally, the pivoting swivel bases 502A-502B are shown coupling to the dual oscillating cycle saddles 501A-501B. The pivoting swivel base 502B is seen to include a first pivoting base 503B that couples to a second pivoting base that couples to the dual oscillating cycle saddle 502B via saddle attachment bolts 503B. Referring to FIG. 5B, a top view of the exemplary illustration of a saddle and swivel base coupler of the dual oscillating cycle saddle and support system of FIG. 5A is shown. FIG. 5B illustrates the positioning of the coupling of the second pivoting base 504B.

Figure 6A:
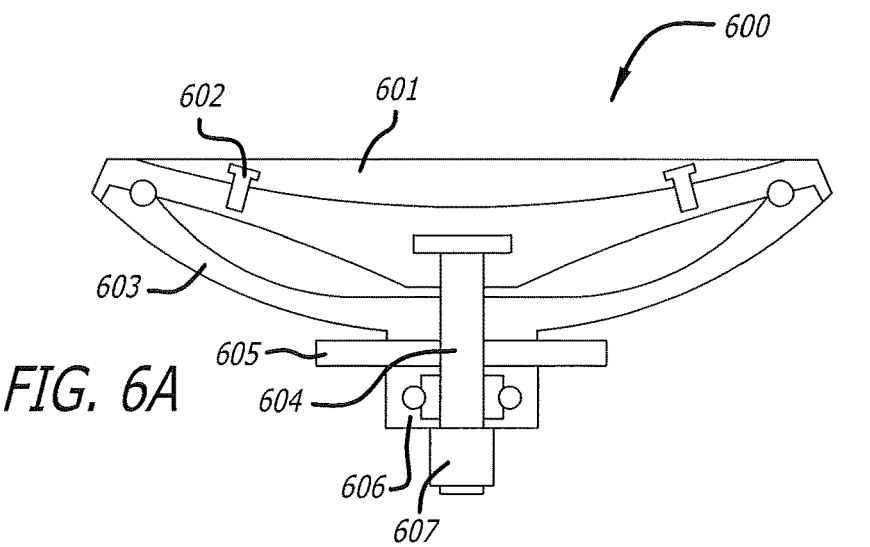
FIG. 6A is lateral view of an exemplary illustration of the swivel base coupler of the dual oscillating cycle saddle and support system of FIG. 1A.
Figure 6B:
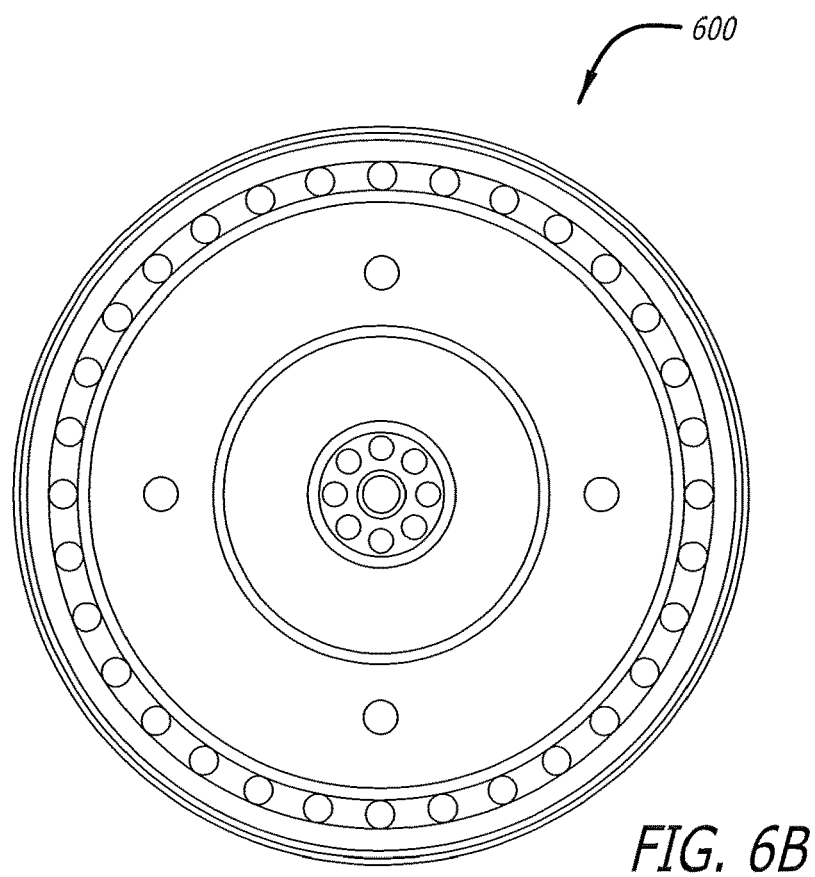
FIG. 6B is top view of an exemplary illustration of the swivel base coupler of the dual oscillating cycle saddle and support system of FIG. 1A.

Referring now to FIG. 6A, a lateral view of an exemplary illustration of the swivel base coupler 600 of the dual oscillating cycle saddle and support system of FIG. 1A is shown. The swivel base coupler 600 includes a first pivoting base 601 that attaches couples to a dual oscillating cycle saddle via base attachment bolts 602. The swivel base coupler 600 also includes an anchoring bolt 604 and a lock nut 607 that couple the first pivoting base 601, a second pivoting base 603, a steel top pendulum plate 605 and a thrust load ball bearing 606 together. FIG. 6B provides a top view of an exemplary illustration of the swivel base coupler 600 of the dual oscillating cycle saddle and support system of FIG. 1A.

Figure 7A:
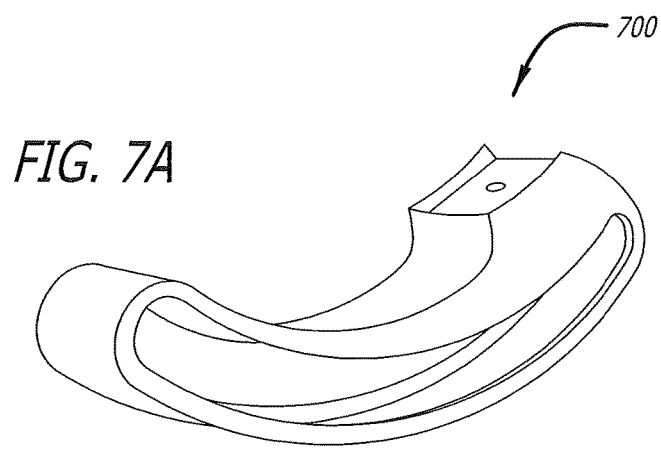
FIG. 7A is an exemplary illustration of a pendulum base of the dual oscillating cycle saddle and support system of FIG. 1A.

Referring to FIG. 7A, an exemplary illustration of a pendulum base of the dual oscillating cycle saddle and support system of FIG. 1A is shown. The pedaling longitudinal pendulum 700 couples to the saddle via the swivel base coupler 600 of FIG. 6A. Additionally, the pedaling longitudinal pendulum 700 includes a cavity that extends through the component, the cavity configured to receive a fixed glide cart of the T-arm 300 of FIG. 3A.

Figure 7B:
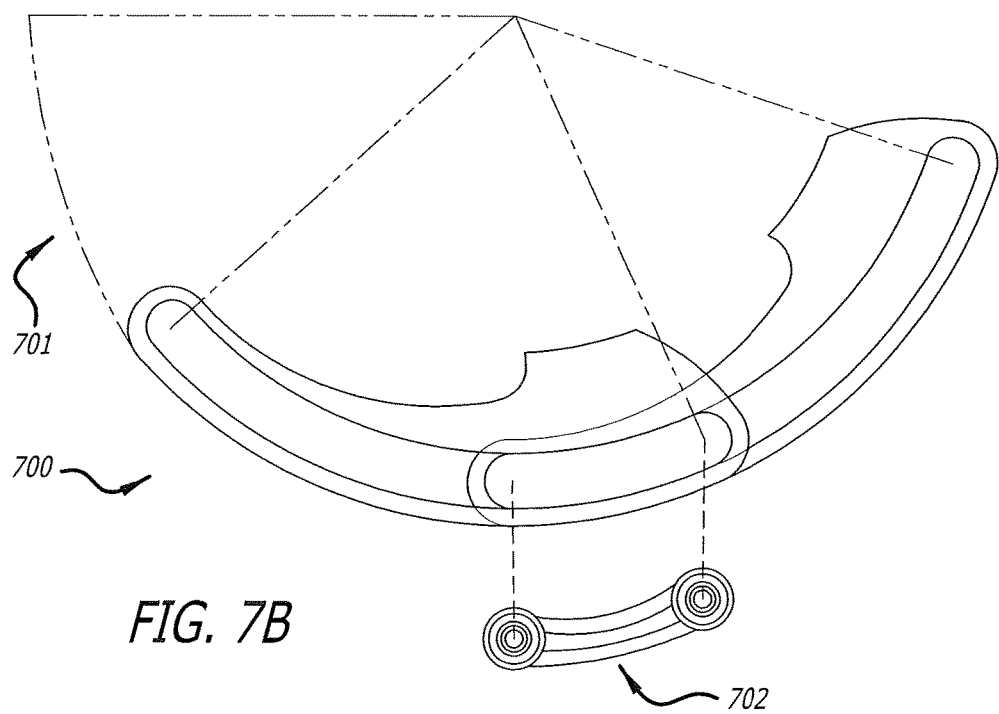
FIG. 7B is an exemplary illustration of a range of the pendulum base of FIG. 7A relative to a fixed glide cart of the dual oscillating cycle saddle and support system of FIG. 1A.

Referring to FIG. 7B, an exemplary illustration of a range of the pendulum base of FIG. 7A relative to a fixed glide cart of the dual oscillating cycle saddle and support system of FIG. 1A is shown. The illustration of FIG. 7B illustration how a fixed glide cart 702 may be inserted into the cavity of the pedaling longitudinal pendulum 700. As a rider pedals while on a cycle utilizing the dual oscillating cycle saddle and support system, the pedaling longitudinal pendulum 700 travels in an arc 701 relative to the fixed glide cart 702. As seen above in FIGS. 2A-2B, when the saddle is in a lower pedaling leg position, the fixed glide cart 702 is seen to be located at a front portion of the track of the pedaling longitudinal pendulum 700. In contrast, when the saddle is in an upper pedaling leg position, the fixed glide cart 702 is seen to be located at a rear portion of the track of the pedaling longitudinal pendulum 700.

Figure 8A:
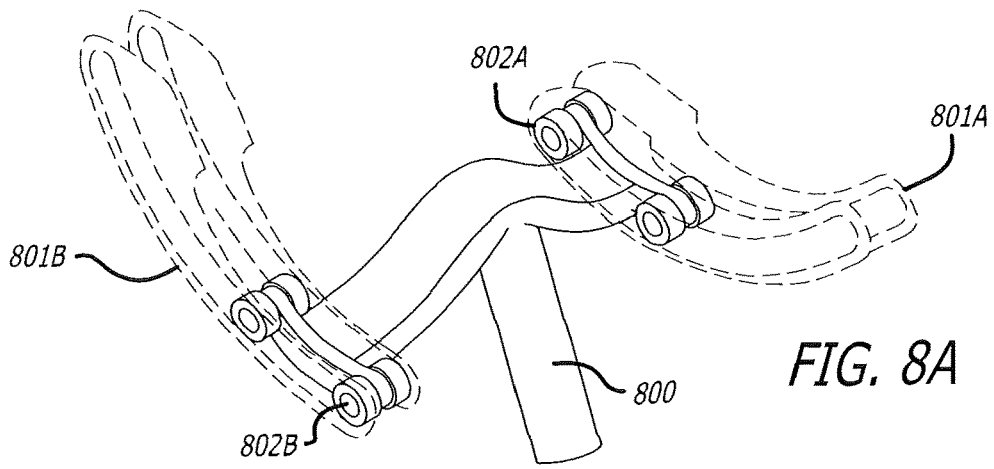
FIG. 8A is a front-side view of an exemplary illustration of the glide carts and a T-arm base of the dual oscillating cycle saddle and support system of FIG. 1A.
Figure 8B:
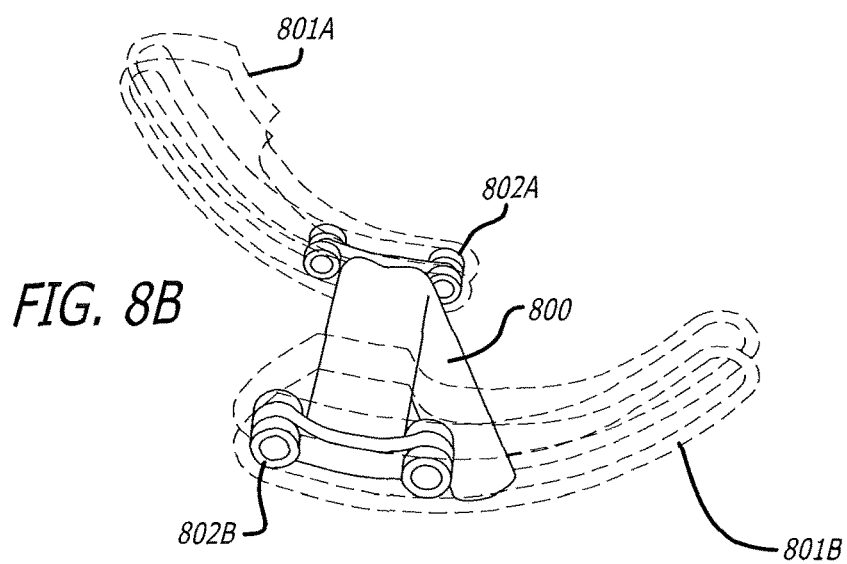
FIG. 8B is a side view of the exemplary illustration of the glide carts and the T-arm base of the dual oscillating cycle saddle and support system of FIG. 8A.
Figure 8C:
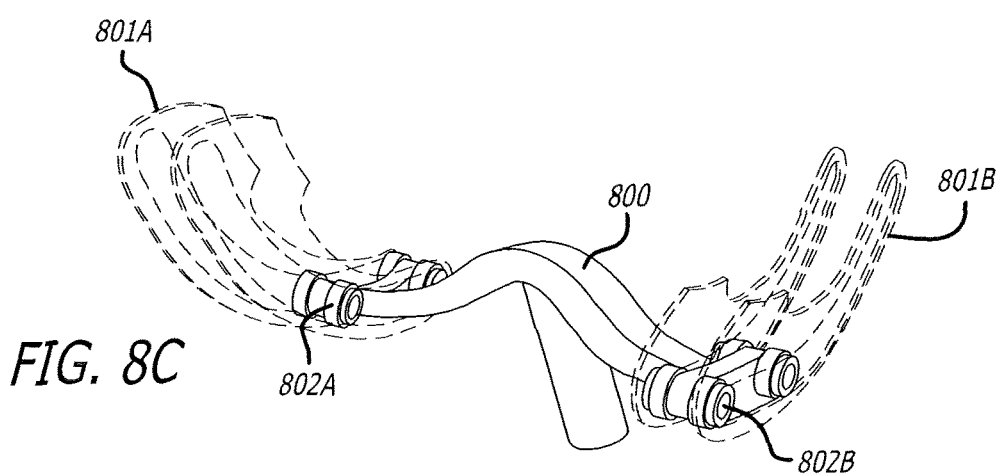
FIG. 8C is a back-side view of the exemplary illustration of the glide carts and the T-arm base of the dual oscillating cycle saddle and support system of FIG. 8A.
Figure 8D:
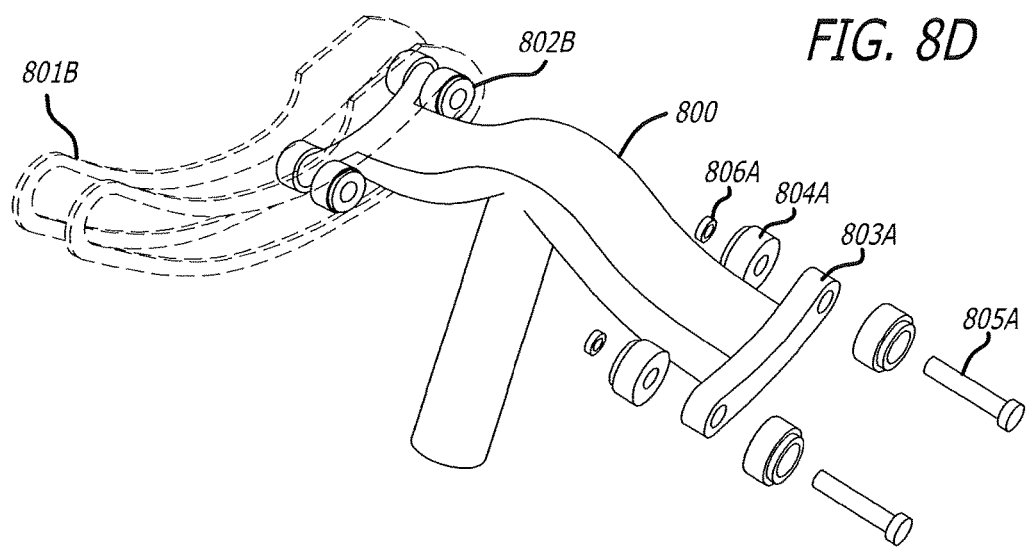
FIG. 8D is an exploded view of an exemplary illustration of a fixed glide cart, rolling elements and the relevant coupling components of the dual oscillating cycle saddle and support system of FIG. 8A.
Figure 9:
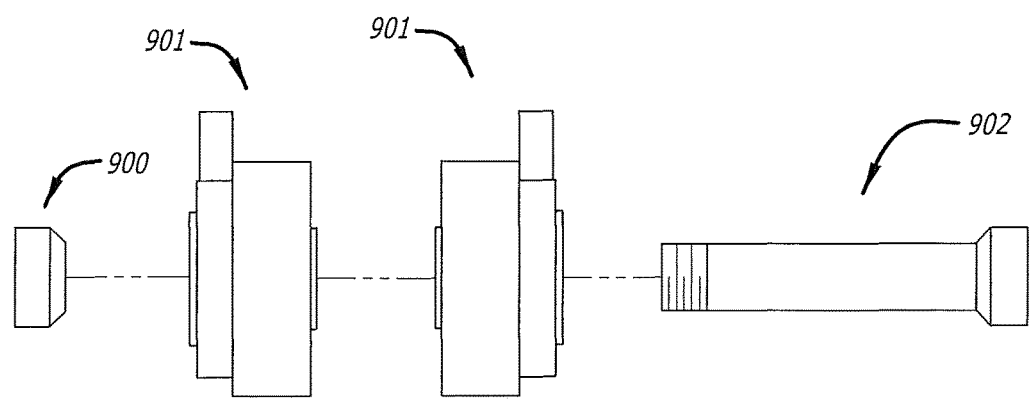
FIG. 9 is an exploded view of an exemplary illustration of the ball bearing and coupling components for coupling the ball bearing to the glide cart of FIG. 8A.

Referring to FIG. 8A, a front-side view of an exemplary illustration of the glide carts and a T-arm base of the dual oscillating cycle saddle and support system of FIG. 1A is shown. The T-arm base 800 extends from the cycle frame to couple with the dual oscillating cycle saddles through the pedaling longitudinal pendulums 801A-801B. In further detail, the pedaling longitudinal pendulum 801A couples to the T-arm base 800 by engaging the fixed glide cart 802A. As will be discussed below, the rolling elements 804A of the fixed glide cart 802A are configured to be inserted into a cavity of the pedaling longitudinal pendulum 801A and, as a rider pedals, the pedaling longitudinal pendulum 801A moves forward and backward in an arc-like motion. FIG. 8B provides a side view of the exemplary illustration of the glide carts and the T-arm base of the dual oscillating cycle saddle and support system of FIG. 8A and FIG. 8C provides a back-side view of the exemplary illustration of the glide carts and the T-arm base of the dual oscillating cycle saddle and support system of FIG. 8A. Referring to FIG. 8D, an exploded view of an exemplary illustration of a fixed glide cart, rolling elements and the relevant coupling components of the dual oscillating cycle saddle and support system of FIG. 8A is shown. As was mentioned above, the glide cart 802A couples the T-arm base 800 with the pedaling longitudinal pendulum 801A. Specifically, the glide cart 802A includes a cart beam 803A, rolling elements 804A, locking bolts 805A and nut insert locks 806A. The cart beam 803A extends from an aim of the T-arm base 800. In one embodiment, the T-arm base 800 including the cart beams 803A-803B may be a single molded component. Additionally, the fixed glide cart 803A may include one or more rolling elements 804A. The embodiment shown in FIG. 8D wherein four rolling elements are shown for each fixed glide cart is merely one embodiment, and not intended to be limiting. FIG. 9 provides an exploded view of an exemplary illustration of the ball bearing and coupling components for coupling the ball bearing to the glide cart of FIG. 8A.

C. Saddle Support System

Figure 10:
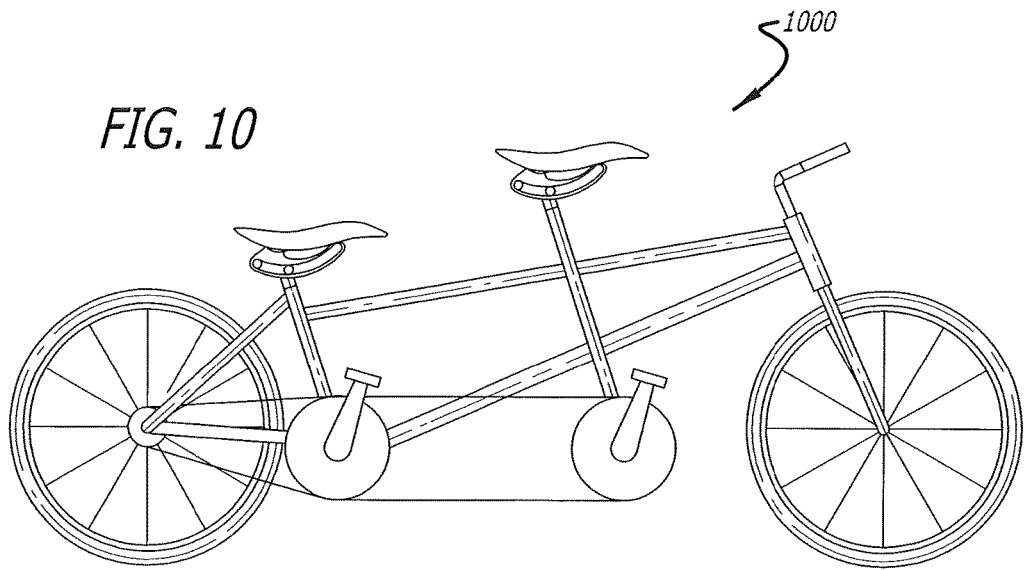
FIG. 10 is an exemplary illustration of the dual oscillating cycle saddle and support system of FIG. 1A incorporated into a tandem bicycle.
Figure 11:
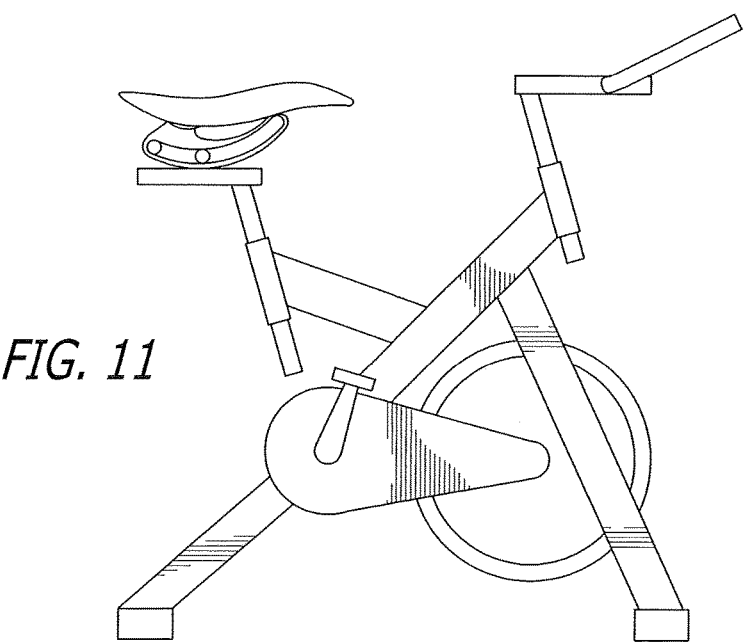
FIG. 11 is an exemplary illustration of the dual oscillating cycle saddle and support system of FIG. 1A incorporated into a stationary cycle.
Figure 12A:
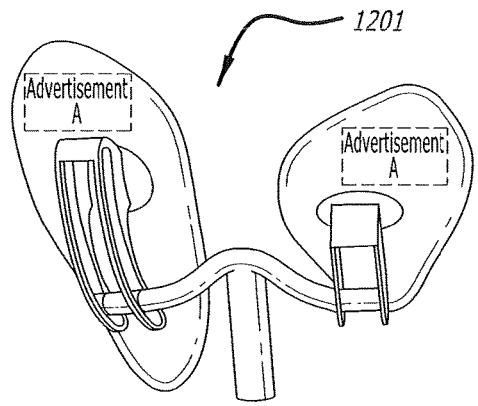
FIG. 12A is an exemplary illustration of the dual oscillating cycle saddle and support system of FIG. 1A used to display a first advertisement.
Figure 12B:
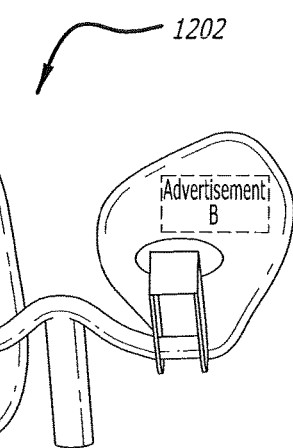
FIG. 12B is an exemplary illustration of the dual oscillating cycle saddle and support system of FIG. 1A used to display a second advertisement.
Figure 12C:
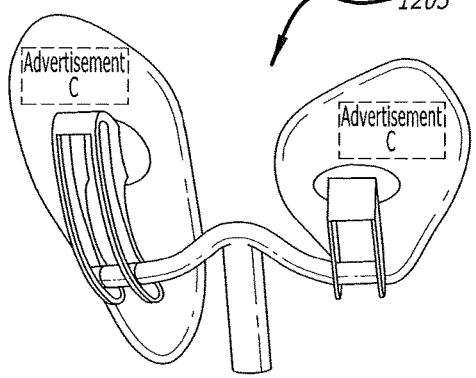
FIG. 12C is an exemplary illustration of the dual oscillating cycle saddle and support system of FIG. 1A used to display a third advertisement.
Figure 12D:
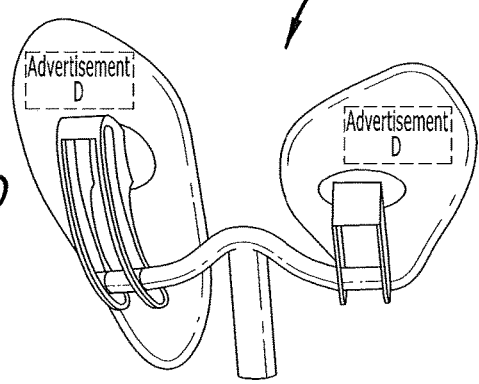
FIG. 12D is an exemplary illustration of the dual oscillating cycle saddle and support system of FIG. 1A used to display a fourth advertisement.

The dual oscillating cycle saddle and support system may be incorporated into any kind of cycle including, but not limited or restricted to a unicycle, a bicycle, and/or a tricycle. Additionally, cycles configured for a plurality of riders. For example, FIG. 10 provides an exemplary illustration of the dual oscillating cycle saddle and support system of FIG. 1A incorporated into a tandem bicycle 1000. In a second embodiment, FIG. 11 provides an exemplary illustration of the dual oscillating cycle saddle and support system of FIG. 1A incorporated into a stationary cycle 1100. Such a stationary cycle incorporating the dual oscillating cycle saddle and support system of FIG. 1A may be utilized in, among other locations, a sports club or a home fitness room.

In one embodiment, as seen in FIGS. 12A-12D, one or more of the dual oscillating cycle saddles may be configured with a region on the underside and/or rear portion of the dual oscillating cycle saddle that may be used to display one or more advertisements. As is illustrated, a portion of the dual oscillating cycle saddle and support system of FIG. 1A may include an advertisement such as "Advertisement A" 1201 shown in FIG. 12A, "Advertisement B" 1202 shown in FIG. 12B, "Advertisement C" 1203 shown in FIG. 12C or "Advertisement D" 1204 shown in FIG. 12D.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A cycle comprising:
    a cycle frame;
    a first saddle component;
    a first support component coupled to the first saddle component and to the cycle frame, wherein the first saddle component moves between an upper pedaling position and a lower pedaling position, wherein the first saddle component is coupled to the first support component at a raised, rear portion of the first saddle component;
    a second saddle component;
    a second support component coupled to the second saddle component and to the cycle frame, wherein the second saddle component moves between the upper pedaling position and the lower pedaling position, and the first saddle component and the second saddle component are configured to distribute a weight of a rider over a buttocks region and an upper leg region of the rider, wherein the second saddle component is coupled to the second support component at a raised, rear portion of the second saddle component; and
    wherein the first saddle component is coupled to the first support component via a swivel base.

2. The cycle of claim 1, wherein the cycle frame includes a T-arm base having a first arm and a second arm, the first support component couples to the cycle frame via the first arm and the second support component couples to the cycle frame via the second arm.

3. The cycle of claim 2, wherein the first arm of the T-arm base includes a fixed glide cart having one or more rolling elements, and the first support component includes a cavity configured to receive the one or more rolling elements of the fixed glide cart.

4. The cycle of claim 3, wherein the one or more rolling elements include ball bearings.

5. The cycle of claim 3, wherein the first support component moves forward and backward relative to the fixed glide cart in a manner corresponding to pedaling of the rider.

6. The cycle of claim 1, wherein the first saddle component and the second saddle component are ergonomically shaped to contour the rider's buttocks region and upper leg region.

7. The cycle of claim 1, wherein the swivel base is configured to enable the first saddle component to swivel relative to the first support component.

8. The cycle of claim 1, wherein the buttocks region includes a pelvis region, a coccyx, a gluteus medius, a gluteus maximus, a gluteus minimus, and a piriformis.

9. The cycle of claim 1, wherein the upper leg region includes a gluteus medius, a gluteus maximus, a gluteus minimus and a piriformis, an adductor magnus, a semitendinosus, and a biceps formis.

10. The cycle of claim 1, wherein a first gap is formed between a front portion of the first saddle component and a front portion of the first support component and wherein a second gap is faulted between a front portion of the second saddle component and a front portion of the second support component.

11. A cycle saddle and support system comprising:
    a first saddle component;
    a first support component coupled to the first saddle component, wherein the first saddle component moves between an upper pedaling position and a lower pedaling position, and wherein the first saddle component is coupled to the first support component at a raised, rear portion of the first saddle component;
    a second saddle component;
    a second support component coupled to the second saddle component, wherein the second saddle component moves between the upper pedaling position and the lower pedaling position, and the first saddle component and the second saddle component are configured to distribute a weight of a rider over a buttocks region and an upper leg region of the rider, wherein the second saddle component is coupled to the second support component at a raised, rear portion of the second saddle component; and
    wherein the first saddle component is coupled to the first support component via a swivel base.

12. The cycle saddle and support system of claim 11, further comprising:
    a T-arm base including a first arm and a second arm, the first arm configured to couple with the first support component and the second arm configured to couple with the second support component, wherein a downward extending portion of the T-arm base is configured to couple with a cycle frame.

13. The cycle saddle and support system of claim 12, wherein the first support component includes a cavity configured to receive a portion of the first arm of the T-arm base and couple the first support component to the T-arm base.

14. The cycle saddle and support system of claim 13, wherein the first arm of the T-arm base includes a fixed glide cart having one or more rolling elements, and the portion of the first aim of the T-arm base received by the cavity includes a fixed cart beam and one or more rolling elements.

15. The cycle saddle and support system of claim 11, wherein the one or more rolling elements include ball bearings.

16. The cycle saddle and support system of claim 11, wherein the first saddle component and the second saddle component are ergonomically shaped to contour the rider's buttocks region and upper leg region.

17. The cycle saddle and support system of claim 11, wherein the buttocks region includes a gluteus medius, a gluteus maximus, a gluteus minimus, and a piriformis.

18. The cycle saddle and support system of claim 11, wherein the upper leg region includes a gluteus medius, a gluteus maximus, a gluteus minimus and a piriformis, an adductor magnus, a semitendinosus, and a biceps formis.

19. The cycle saddle and support system of claim 11, wherein the swivel base is configured to enable the first saddle component to swivel relative to the first support component.

20. The cycle saddle and support system of claim 11, wherein a first gap is formed between a front portion of the first saddle component and a front portion of the first support component and wherein a second gap is formed between a front portion of the second saddle component and a front portion of the second support component.

* * * * *